(12) United States Patent
Kendle

(10) Patent No.: US 11,606,850 B2
(45) Date of Patent: Mar. 14, 2023

(54) CURRENT AND POWER REGULATION CIRCUITS FOR LED DRIVER

(71) Applicant: Sterling Lighting LLC, Sterling, VA (US)

(72) Inventor: Paul Kendle, Benton, KY (US)

( * ) Notice: Subject to any disclaimer, the term of this patent is extended or adjusted under 35 U.S.C. 154(b) by 128 days.

(21) Appl. No.: 16/991,641

(22) Filed: Aug. 12, 2020

(65) Prior Publication Data

US 2022/0053624 A1 Feb. 17, 2022

(51) Int. Cl.
*H02H 7/20* (2006.01)
*H05B 45/14* (2020.01)
*H05B 45/56* (2020.01)

(52) U.S. Cl.
CPC ............... *H05B 45/56* (2020.01); *H02H 7/20* (2013.01); *H05B 45/14* (2020.01)

(58) Field of Classification Search
CPC ................................ H05B 45/56; H05B 45/14
See application file for complete search history.

(56) References Cited

U.S. PATENT DOCUMENTS

| | | | |
|---|---|---|---|
| 8,956,018 B2 | 2/2015 | Deshpande et al. | |
| 9,654,678 B1 | 5/2017 | Fu et al. | |
| 10,542,594 B2 | 1/2020 | Lin et al. | |
| 2011/0193542 A1* | 8/2011 | Kwok | H05B 45/3725 |
| | | | 323/284 |
| 2011/0227489 A1* | 9/2011 | Huynh | H05B 45/30 |
| | | | 315/185 R |
| 2011/0304270 A1 | 12/2011 | Scarpelli | |
| 2013/0093325 A1 | 4/2013 | Scarpelli | |
| 2015/0035440 A1 | 2/2015 | Spero | |
| 2017/0374261 A1 | 12/2017 | Teich et al. | |
| 2020/0063951 A1 | 2/2020 | Yu et al. | |

OTHER PUBLICATIONS

Spec HV9963, Closed-Loop LED Driver with Enhanced PWM Dimming, by Microchip Technology Inc., pp. 1-20 (2019).
HV9963 Boost LED Driver Demonstration Board User's Guide, by Microchip Technology Inc. (2016).
Sterling Lighting SL01—Cups and Drivers, pp. 1-36 (Jul. 2, 2020).

(Continued)

*Primary Examiner* — Dedei K Hammond
(74) *Attorney, Agent, or Firm* — Robert C. Kain; The Concept Law Group, P.A.

(57) ABSTRACT

The current regulation system, providing fine dimming control, has an under-voltage circuit, an over-temperature control circuit, and sometimes a variable resistor (VR) control circuit. The under-voltage and over-temperature controls (first and second control signals) pass through voltage limiters such that the lowest level voltage control signal is applied to the voltage reference signal IREF input of LED IC driver. IC driver has a voltage reference input IREF which controls an IC output current for an LED load demand. The VR control generates a third control signal at the junction to reduce the voltage reference signal under control of the VR. The lowest level control signal dims the LED lamps. Since low level voltage control signals are used, a low voltage turn OFF circuit applies an IC disablement signal to the LED IC driver input control based upon sensing a very low voltage at the junction.

12 Claims, 8 Drawing Sheets

(56) References Cited

OTHER PUBLICATIONS

TFA01 Up Light—Sterling Lighting (Jul. 2, 2020); https://sterling-lighting.com/product/tfaO1-up-light/.
English Translation of CN Application No. 201410210205.2; Filing date: May 19, 2014; Title: An MR16LED driving power source.
English Translation of CN Application No. 201410210388.8; Filing date: May 19, 2014; Title: A wall washer.
English Translation of CN Application No. 201420254066.9; Filing date: May 19, 2014; Title: A compact LED driving power source.
Chinese Application for SL01 Uplight Driver; https://sterling-lighting.com/products-cups-and-drivers/.

* cited by examiner

CURRENT AND POWER REGULATION CIRCUITS FOR LED DRIVER

FIELD OF THE INVENTION

The present invention relates generally to current regulation circuits, operating in conjunction with a LED integrated circuit (IC) driver, to limit power to light emitting diode (LED) lights, and, more particularly, to provide an LED driver which can dim LED lamps by providing control circuits with low voltage protection systems, providing fine dimming LED control.

BACKGROUND OF THE INVENTION

LED lights are, in general, more energy efficient than incandescent lights. However, LED lights are supplied with direct current (DC) voltage as compared with alternating current (AC) power supplied to incandescent lights. Hence, LED power circuits utilize rectifier circuits to convert AC power into DC power for the LEDs. When the rectifier circuit is placed in close proximity to the LED drivers, the heat emitted from the LEDs may adversely effect the performance and the operational life of the rectifier circuit, especially when the LED driver circuit is an IC. Higher operating temperatures shorten the operational life of the LED IC driver.

When the LEDs are mounted in metal fixtures adjacent the LED IC driver, such as when the LED light is mounted in a brass fixture, the internal cavity of the fixture heats up due to driver operations and LED power dissipation and this buildup of heat in and about the LED driver shortens operational life of both the mounted LED and driver. Although the metal casing holding the LED acts as a heat sump (dissipating LED generated heat), if this mounted LED lamp is used outdoors, the outside ambient temperature may contribute to this overheating problem.

Some LED light strings are serially electrically powered by a single LED driver sub-system. Also, the LED driver sub-system may be a relatively long distance away from the LED lights. In these configurations, the input voltage to each serially connected LED lamp may be too low or the LED lamps may be under powered. This low power condition may not be acceptable to the consumer because the LED light string may not emit the desired amount of light. Prior art LED IC driver systems do not correct for this low power condition. Also, the lower voltage condition at the LED load end may cause the LED driver circuit to increase its current output to maintain the LED load at the desired power level. This lower voltage/higher current output also may cause overheating of the IC driver.

If the LED lamp or multiple lamp system is supplied with chronically low voltage, the better practice is to turn OFF the LED driver because, if the driver is left in that condition, the IC driver will fail or its operational life span will be greatly diminished.

Another problem encountered by prior art systems arises when the LED is mounted on the printed circuit board (a PCBA or PCB assembly), commonly called a clip-on board (COB) mounted LED. In this situation, the voltage requirement of the COB LED is higher than the voltage supplied by the IC driver. Hence, a voltage boost circuit must be utilized or, alternatively, the current increased to reach the required power supply for the COB LED.

Although the use of LED IC drivers reduces the cost of manufacturing with surface mounted technology (SMT) for powering fixture-mounted LED lamps and powering wired, multiple LED lamp systems, prior art LED IC drivers suffer from the aforementioned problems. These problems are exasperated when prior art systems use undersized capacitors in PCB driver assemblies.

Therefore, a need exists to overcome the problems (overheating, under-voltage, chronically low voltage, and over-voltage) with the prior art as discussed above.

SUMMARY OF THE INVENTION

The invention provides current and power regulation circuits for an LED driver that overcomes the hereinafore-mentioned disadvantages of the heretofore-known devices and methods.

To correct the overheating of the LED IC driver, an over-temperature current reduction circuit is provided which adjusts the output of the LED driver.

To correct the too-low voltage supplied to the LED lamp or the connected, multiple LED lamp system, an under voltage current control circuit is provided which adjusts the output of the LED driver.

To correct the chronically low voltage condition, a low voltage turn-OFF LED driver control circuit is provided.

To permit the user to more easily control the lumen output of the LED lamp(s) (a dimmer operation), a remote-controlled variable resistor (VR) reduces the power output of the LED IC driver.

The current regulation system, providing fine dimming control, has an under-voltage circuit, an over-temperature control circuit, and sometimes a variable resistor (VR) control circuit. The under-voltage and over-temperature controls (first and second control signals) pass through voltage limiters such that the lowest level voltage control signal is applied at a junction as the current reference signal input (IREF) of LED IC driver. The LED IC driver has a voltage reference input IREF which controls an IC output current for the LED load demand. The VR control generates a third voltage control signal at the junction to reduce the voltage reference signal IREF under control of the VR. The lowest voltage level control signal (represented by a voltage (V) output by the under voltage and over temperature control circuits) dims the LED lamps. Since low V voltage level control signals are applied, a low voltage turn OFF circuit is needed which generates and applies an IC disablement signal to the LED IC driver input control based upon sensing a very low voltage at the junction.

With the foregoing and other objects in view, there is provided, in accordance with the invention, a current regulation system in combination with an LED integrated circuit (IC) driver having a current control input IREF (a voltage control input, the "voltage reference input") to control an IC output current for an LED load demand (powering a single LED or a number of LED lamps). The current regulation system has an under-voltage circuit which generates a first voltage reference input to a junction which first input reduces the voltage reference signal IREF when an input voltage of the LED driver, supplied to the under-voltage circuit, falls below a predetermined level. The system also has an over-temperature control circuit which generates a second voltage reference input to the junction which second input reduces the voltage reference signal when a proximally sensed temperature of the LED driver exceeds a predetermined level. The lower of these two voltage reference signals are allied to the IREF input of the IC.

In accordance with another feature, an embodiment of the present invention includes, for the under-voltage and the over-temperature control circuits, first and second voltage limiters passing only the lowest voltage level control signal to the junction as the voltage reference input IREF to the LED IC driver.

In accordance with a further feature of the present invention, the system includes a variable resistor (VR) control circuit to generate a third input to the junction to reduce the voltage reference signal under control of a VR in the VR control circuit. The level of the third input is set never to exceed a predetermined voltage "V" level.

In accordance with a further feature of the present invention and wherein the LED IC driver includes a disable IC input control which disconnects a LED load from the LED driver, the current regulation system includes a low voltage turn OFF circuit generating and applying a disablement signal to the disable IC input control based upon sensing a very low voltage at the junction.

In accordance with the present invention, the current regulation system is employed in combination with an LED integrated circuit (IC) driver having a current reference input IREF to control an IC output current for an LED load demand. The LED IC driver has a pulse width modulation (PWM) converter operating at a substantially constant frequency with peak current and slope compensation. The LED IC driver has an internal transconductance amplifier to control the IC output current. The IC driver also has a disable IC input control to disconnect the LED load from the LED IC driver. The current regulation system includes an under-voltage circuit which generates a first voltage reference input to a junction which first input reduces the voltage reference signal IREF when an input voltage supplied to the LED driver falls below a predetermined level. The system includes an over-temperature control circuit which generates a second input to the junction which second input reduces the voltage reference signal when a proximally sensed temperature of the LED driver exceeds a predetermined level. Also, the system includes a low voltage turn OFF circuit generating and applying a disablement signal to the disable IC input control based upon sensing a very low voltage at the junction.

In accordance with another embodiment, the present invention is a current regulation system providing fine dimming controls, used in combination with an LED integrated circuit (IC) driver having a current reference input IREF to control an IC output current for an LED lamp load. The current regulation and dimming control includes an under-voltage control circuit which generates a first input to a junction, which first input reduces the voltage reference signal IREF when an input voltage supplied to the LED driver falls below a predetermined level thereby dimming the LED lamp load. The regulator and dimmer has an over-temperature control circuit which generates a second input to the junction which second input reduces the voltage reference signal when a proximally sensed temperature of the LED driver exceeds a predetermined level thereby dimming the LED lamp load. The regulator and dimmer also has first and second voltage limiters respectively on the under-voltage circuit and the over-temperature circuit passing, at the junction, the lowest level voltage control signal to the voltage reference input IREF. The regulator and dimmer further has a low voltage turn OFF circuit generating and applying an IC disablement signal to the LED IC driver input control based upon sensing a very low voltage at the junction.

Although the invention is illustrated and described herein as embodied in current and power regulation circuits for a specific LED driver, it is, nevertheless, not intended to be limited to the details shown because various modifications and structural changes may be made therein without departing from the spirit of the invention and within the scope and range of equivalents of the claims. For example, other LED drivers may be controlled in a similar manner. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected", "mounted" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
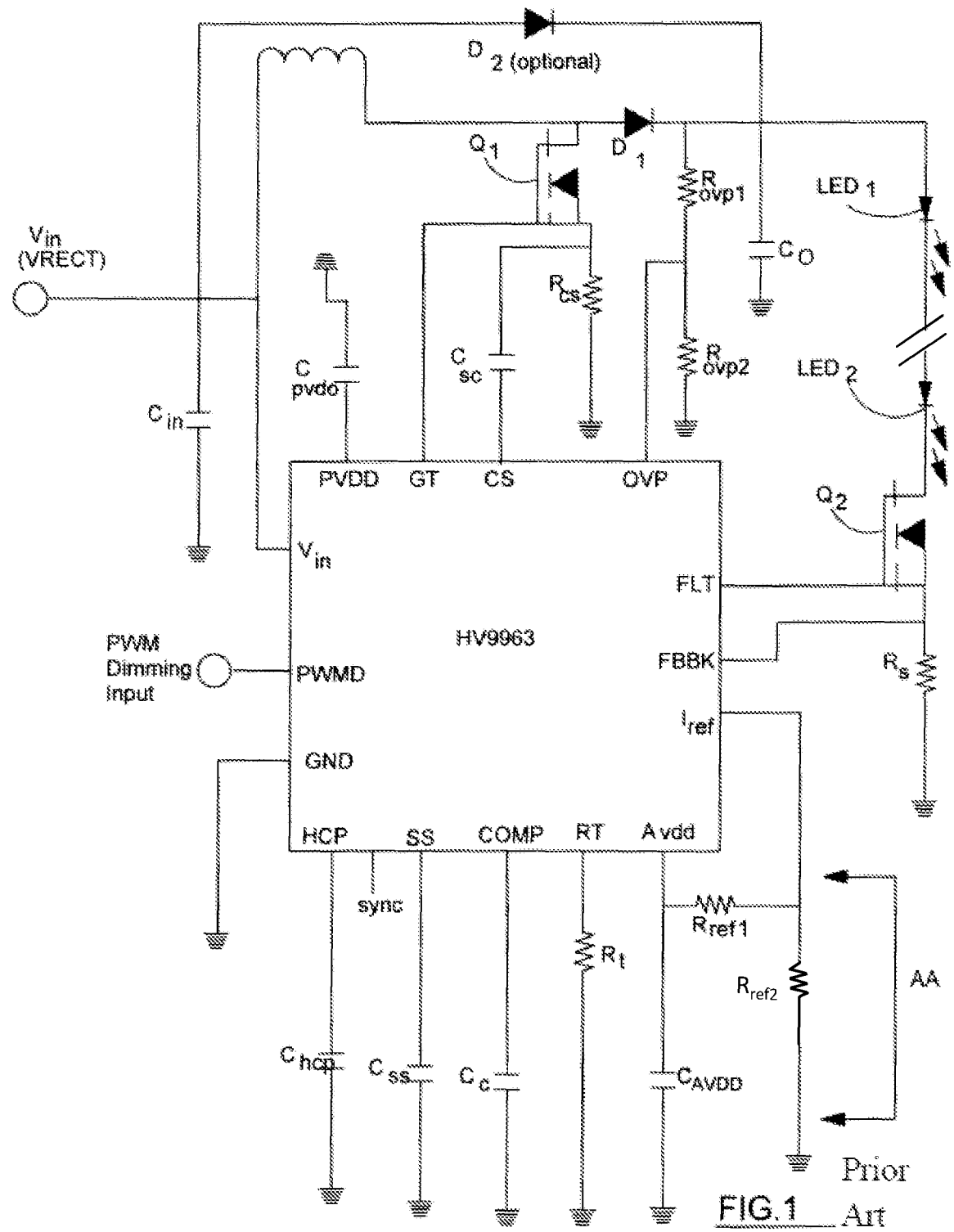
FIG. 1 is a schematic of a prior art IC LED driver.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 shows the schematic for the prior art, Microchip Technology Inc., LED IC driver called the "Closed-Loop LED Driver with Enhanced PWM Dimming," product model code HV9963. The prior art IC is a current-mode control LED driver designed to control single-switch PWM (pulse width modulated) converters (buck, boost, buck-boost, or SEPIC) in a constant frequency mode. The prior art IC controller uses a peak current-mode control scheme (with programmable slope compensation) and includes an internal transconductance amplifier to control the output current over all line and load conditions. Multiple HV9963 IC drivers can be synchronized with each other or with an external clock using a SYNC pin. The prior art IC driver also provides a disconnect switch GATE (GT) drive output, which can disconnect the LEDs using an external disconnect FET Q1 in case of a fault condition and help achieve high PWM dimming ratio. The 10V external FET drivers allow the use of standard level FETs. The low-voltage 5.0V AVDD is used to power the internal control logic circuitry and also acts as a reference voltage to set the output LED current level. The prior art IC driver includes an enhanced PWM dimming logic that enables very high PWM dimming ratios. The prior art IC driver also provides a TTL-compatible, low-frequency PWM dimming input that can accept an external control signal with a duty ratio of 0% to 100% and a frequency of up to a few tens of kilohertz.

The prior art IC driver in FIG. 1 has the following features, input, output, and control points. Vin is the input of the 40V high-voltage regulator. Capacitor C-in acts is a low frequency filter for the AC supply. Inductor L1 is a boost inductor to smooth out ripples in the supply current. Diode D-1 is a one-way current control which further maintains the voltage level at its output. If a voltage at PVDD is being applied from an external power supply, the VIN and PVDD pins should be shorted. PVDD is a regulated 10V supply for the two gate drivers, FLT and GATE (GT). It must be bypassed with a low ESR capacitor C-pvdd to ground GND (at least 1 sF). GT refers to a Gate driver output for the switching FET, Q1. GND is the ground return for the entire low-power analog internal circuitry as well as gate drivers. The GND is connected to the return path from the driver's input. CS is used to sense the source current of the external power FET, Q1. It includes a built-in 100 ns (minimum) blanking time. Capacitor C-sc and resistor R-cs act as a filter to maintain the operation of switching FET, Q1. HCP provides the hiccup timer in case of a fault. A capacitor C-hcp at this HCP pin programs the hiccup time. RT sets the frequency of the power circuit. A resistor R-t between RT and GND programs the IC driver circuit in constant frequency mode. The switching frequency is synchronized to the PWMD input. The oscillator will turn ON once PWMD goes high. SYNC is an input/output (I/O) port (not connected in FIG. 1) which may be connected to the SYNC pin of other coupled IC driver circuits and will cause the oscillators to lock to the highest frequency oscillator. SS is used to provide soft start upon turn-ON of the IC. A capacitor C-ss at the SS input programs the soft start time.

The prior art IC driver in FIG. 1 has an AVDD power supply pin for all internal control circuits with a voltage divider by resisters R-ref1 and R-ref2. This AVDD voltage is also used as reference voltage both internally and externally. It must be bypassed with a low ESR capacitor C-avdd to GND (at least 0.1 µF). The FLT signal is used to drive an external disconnect FET Q2 which disconnects the load from the circuit during a fault condition or during PWM dimming to achieve a very high dimming ratio. OVP provides the overvoltage protection for the converter with resistive divider R-ovp1 and R-ovp2. When the OVP voltage at this pin exceeds 1.25V, the GATE output FLT of the IC driver is turned OFF and FLT goes low. The hiccup timer starts when the voltage at the OVP pin goes below 1.125V. Upon completion of the hiccup timing, the IC attempts to restart. PWMD is an input control (a "disable IC input control") such that when the signal at this PWMD is pulled to GND (or left open), the IC driver switch output is disabled OFF. When an external TTL high level is applied to the PWMD input, the IC driver switching will resume ON. The COMP control is a stable closed-loop control that can be accomplished by connecting a compensation network between COMP and GND. The COMP control is isolated by capacitor C-c. The prior art IC driver FDBK pin is an output current feedback voltage to the IC driver using a current sense resistor R-s.

The prior art IC driver in FIG. 1 has an IREF input wherein the voltage at this input pin sets the output current level of the IC driver. In the prior art device of FIG. 1, the output current reference IREF is represented by a voltage and this prior art control signal can be set using a resistor divider Rref and Rref2 from the AVDD pin. Connecting a voltage greater than 1.25V at this IREF input will disable the short-circuit comparator.

Figure 4:
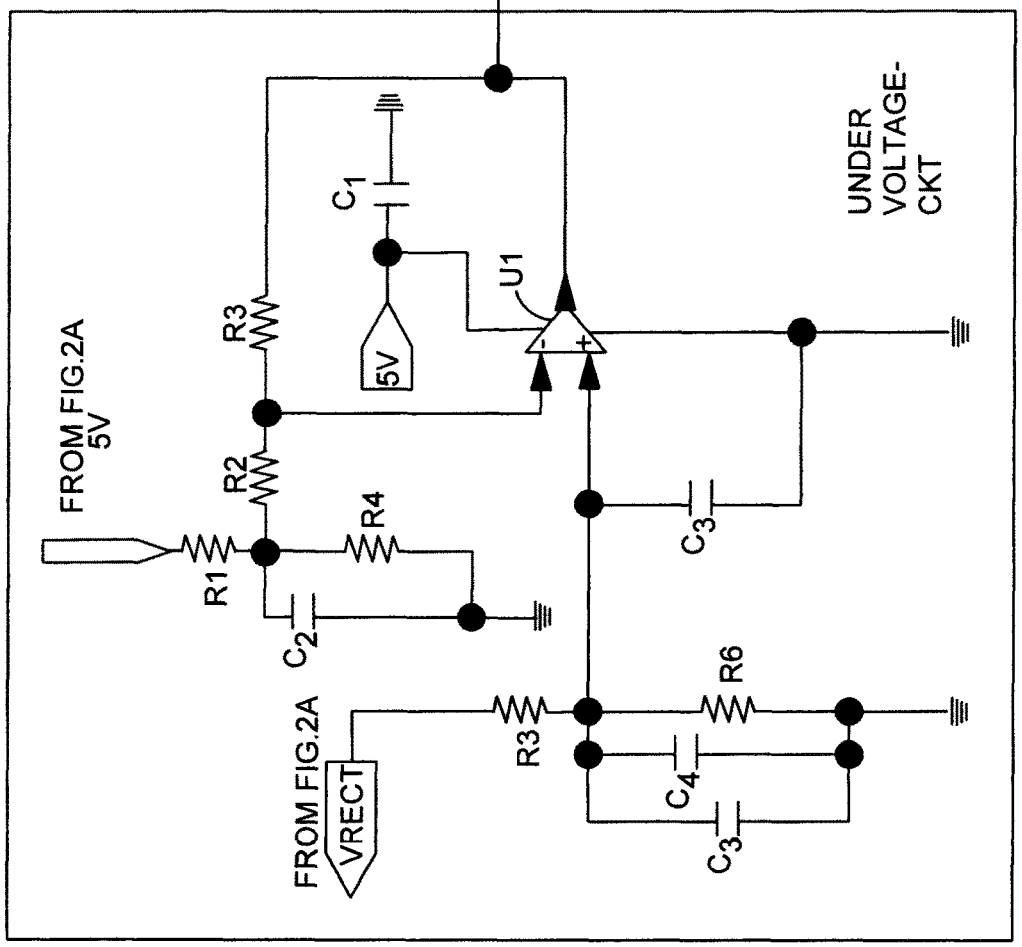
FIG. 4 is a schematic of the under-voltage control circuit (an input voltage monitor) in accordance with the principles of the present invention.
Figure 5:
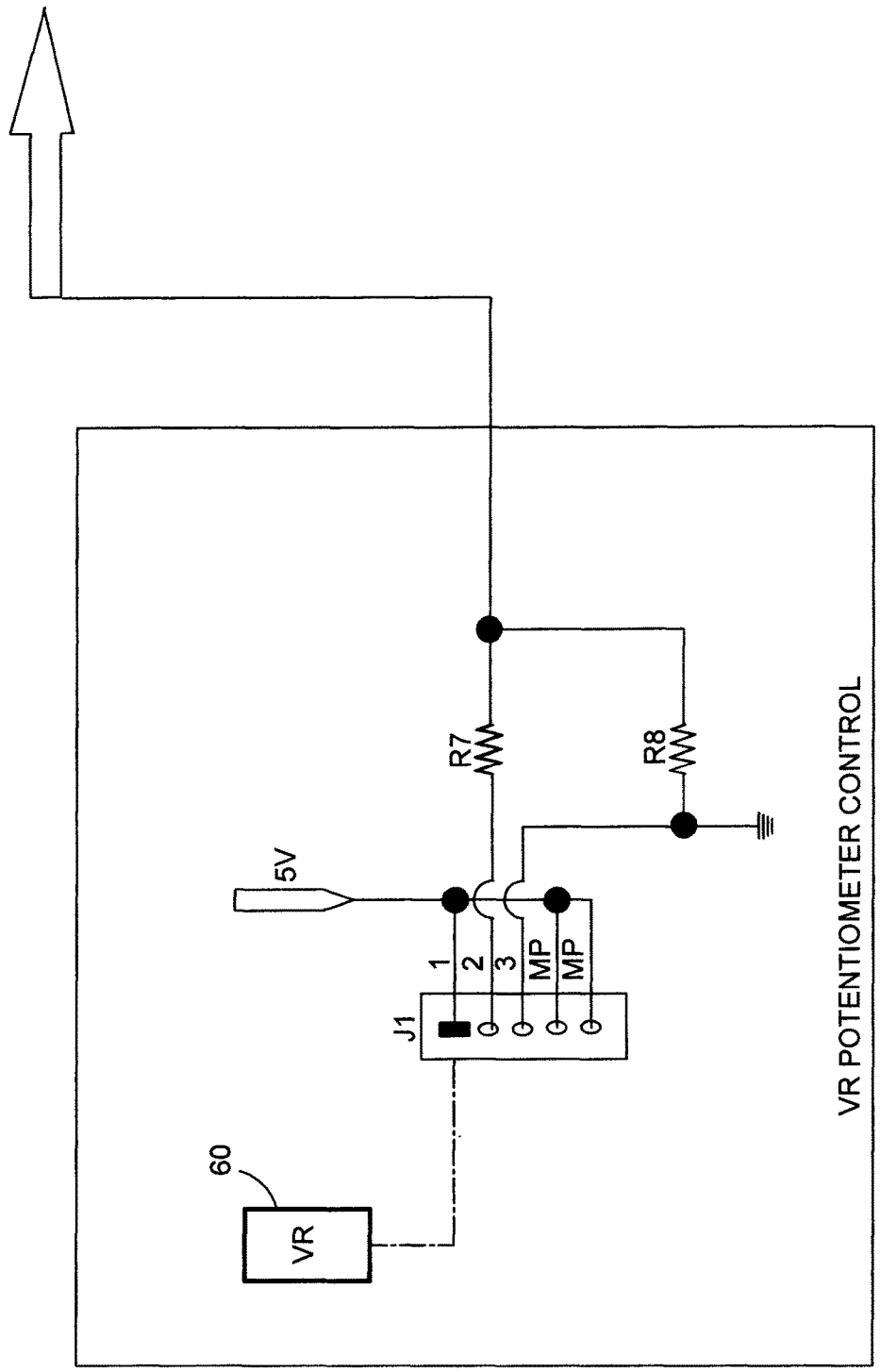
FIG. 5 is a schematic of the variable resistor (VR) control circuit (a potentiometer control circuit) in accordance with the principles of the present invention.
Figure 6:
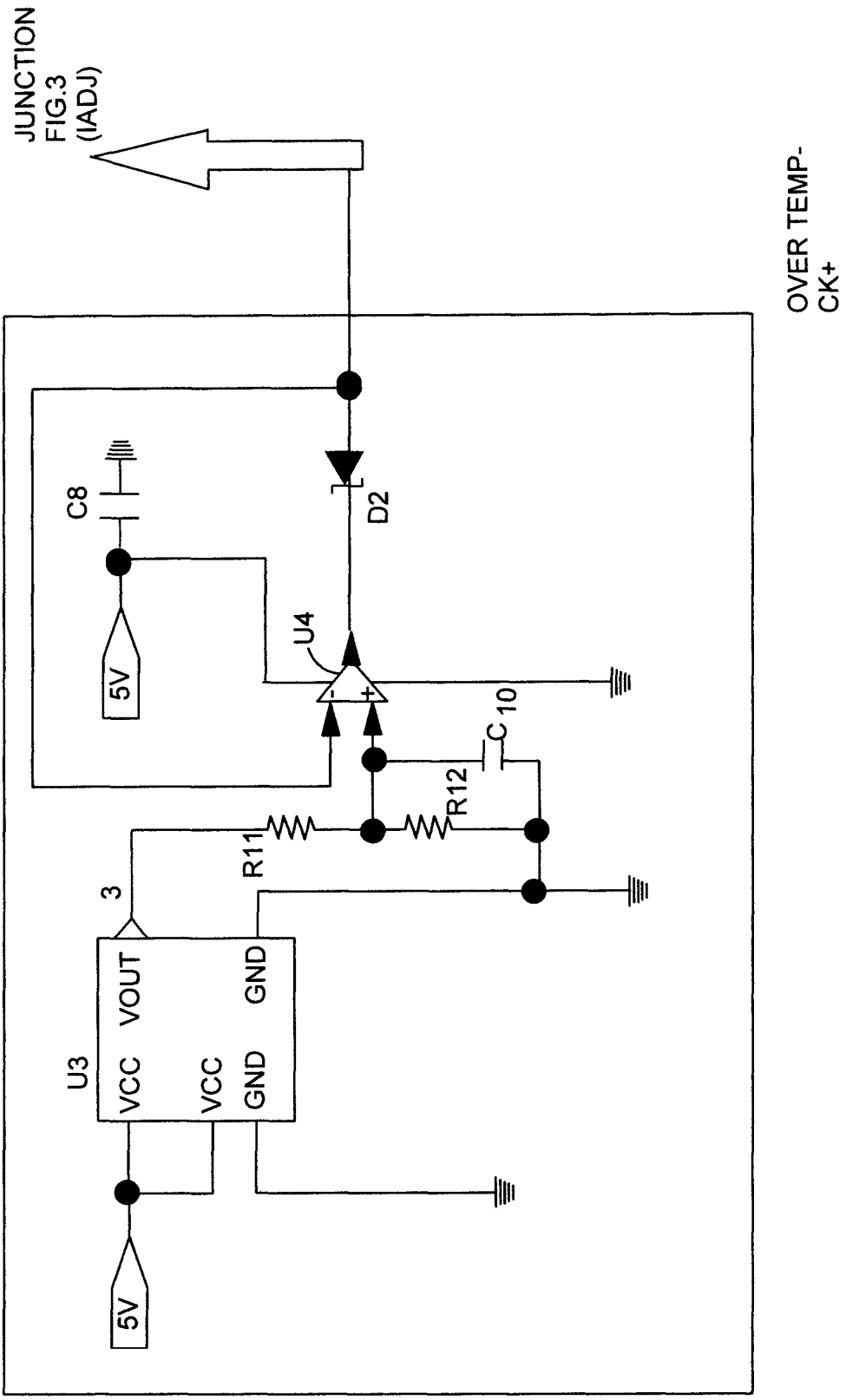
FIG. 6 is a schematic of the over-temperature control circuit (a temperature monitor circuit) in accordance with the principles of the present invention; and, FIG. 7 is a schematic of low voltage turn-OFF circuit in accordance with the principles of the present invention.

In the present invention, the current regulation circuits in FIGS. 4, 5, 6 are voltage control circuits which are coupled together to set and apply the lowest level voltage reference signal at the IC driver's IREF input. Bracket AA in FIG. 1 refers to these inventive control features and circuits. As explained later, the regulated control voltage IADJ is applied to the IREF. AVDD is not coupled to the IREF pin in the inventive systems. The AVDD input to the IC is connected to IREF through the potentiometer circuit in FIG. 5.

The prior art specification for the IC driver, HV9963, states that AVDD control input can also be used as a reference voltage to set the LED current using a resistor divider to the IREF pin. In the prior art system, the voltage at the IREF pin (which sets the LED's output current) is set using a resistor divider R-ref1, R-ref2 from the AVDD pin. The prior art indicates that AVVD can also be set externally with a voltage source. This reference voltage is compared to the voltage from the LED current sense resistor R-s at the FDBK pin by an internal transconductance amplifier. Linear dimming can also be performed by the prior art IC driver by varying the voltages at the IREF pin.

The present invention provides a novel and efficient current and power regulation circuits for an LED driver. Further, the present invention provides controlled dimmer circuits. As stated earlier, due to the problems stated above, this AVDD-IREF reference voltage control is an inadequate control for the prior art LED IC driver. The prior art LED driver does not correct for overheating of the IC LED driver. Hence, an over-temperature current reduction circuit is needed which adjusts the output of the SMT IC LED driver. The prior art LED driver does not correct a low voltage or power supplied to the LED lamp or the connected, multiple LED lamp system. Hence, an under voltage current control circuit is needed which adjusts the output of the IC LED driver. The prior art LED driver does not reduce LED current to zero even when the voltage at IREF is commanded to zero. Therefore, a low voltage turn-OFF LED driver control circuit is needed. Also, to permit the user to more easily control the lumen output of the LED, a remote-controlled variable resistor VR reduces the power output of the IC LED driver.

Figure 2A:
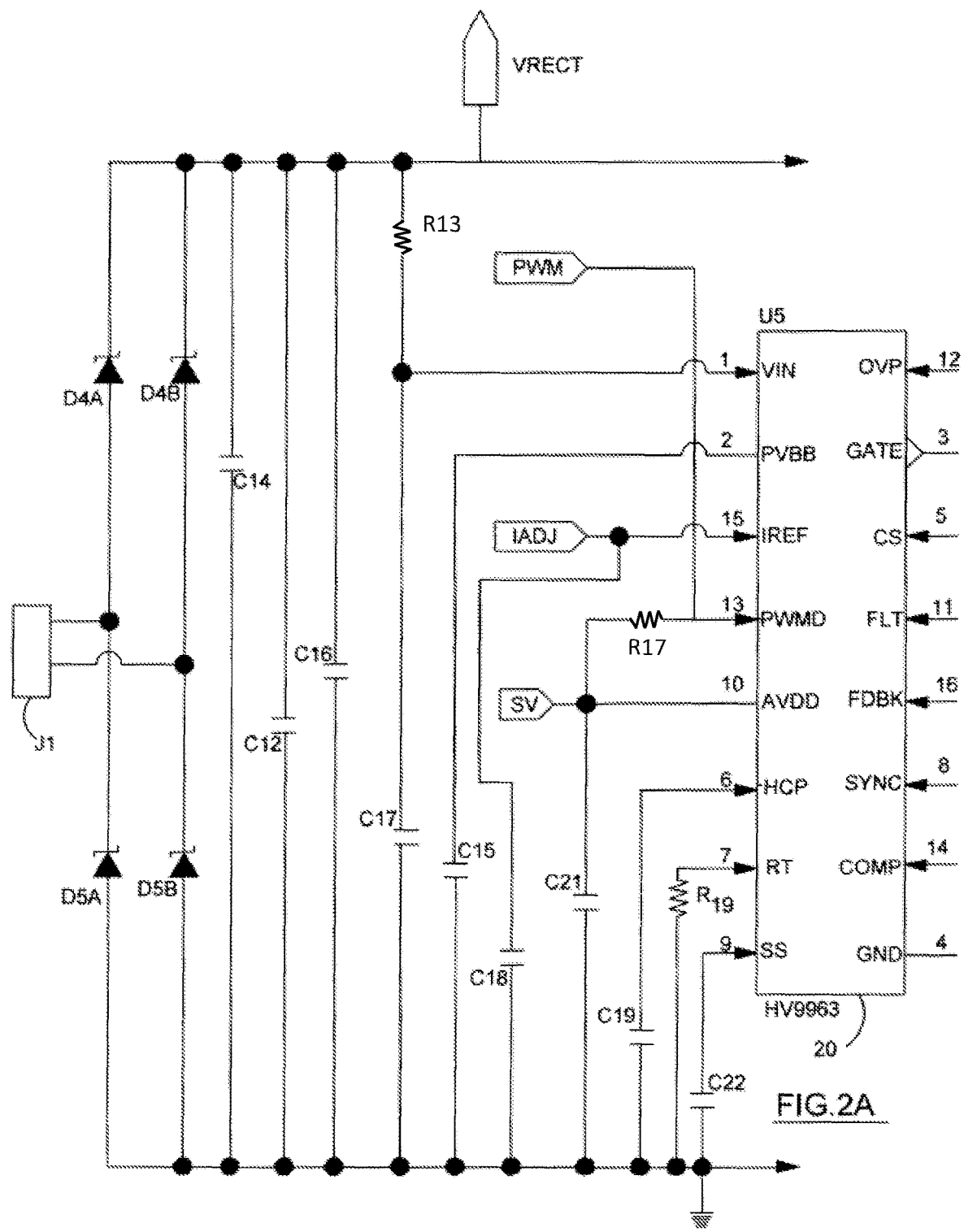
FIGS. 2A and 2B are to be viewed together as a single schematic showing a working embodiment of the invention employing the prior art LED IC driver (the prior art LED IC driver 20 shown in both FIGS. 2A and 2B)
Figure 2B:
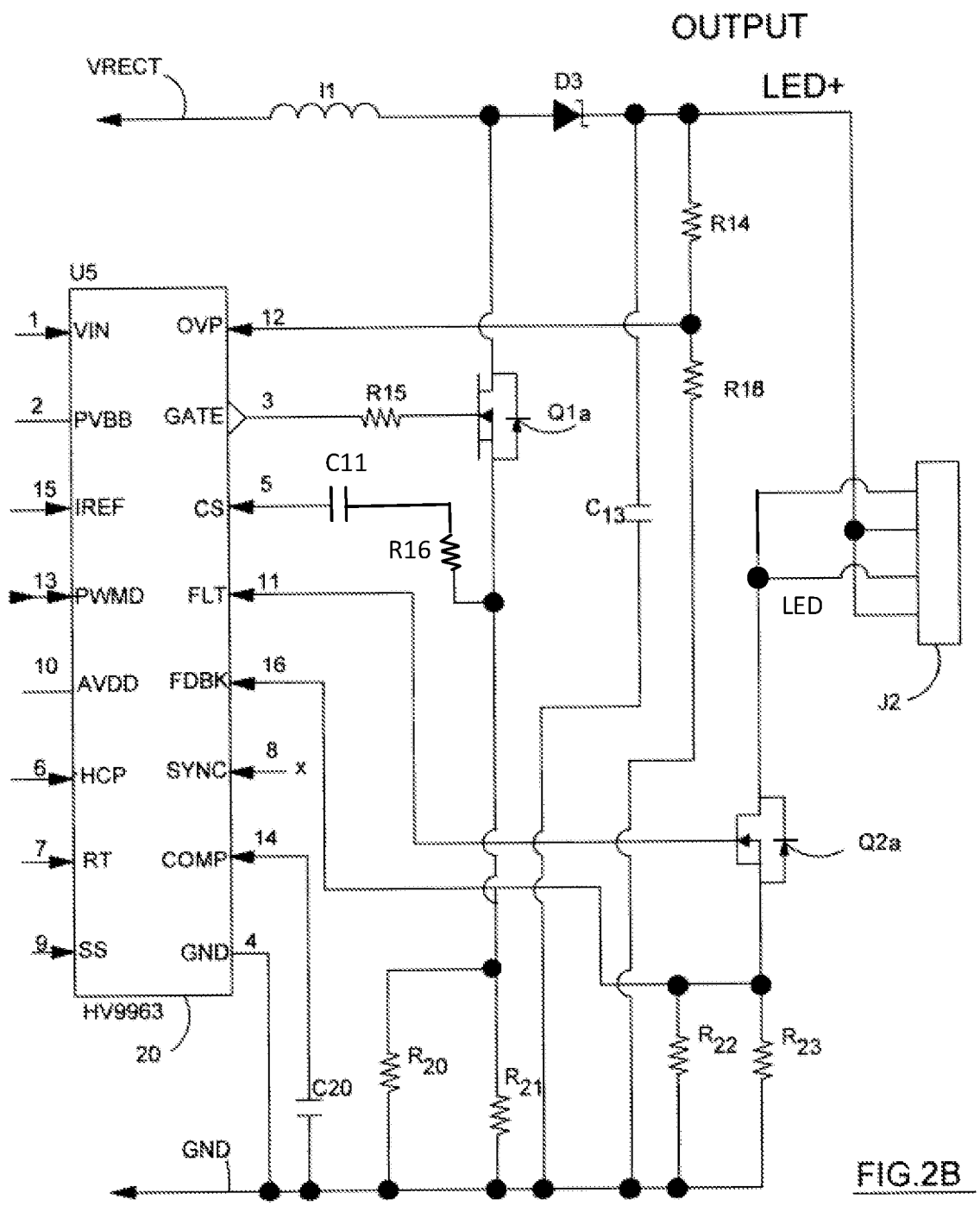

FIGS. 2A and 2B are discussed concurrently herein. The current embodiment of the invention employs the prior art IC LED driver from Microchip Technology, that is the Closed-Loop LED Driver with Enhanced PWM Dimming IC, product model code HV9963. In FIGS. 2A, 2B, the current-mode control LED driver 20 control the internal PWM converters in a constant frequency mode. Although a single IC 20 is shown in the embodiment, multiple IC drivers can be synchronized with each other at the SYNC pin 8. The IC driver also provides a disconnect switch GATE drive output (pin 3), which can disconnect the LEDs using an external disconnect FET Q1a in case of a fault condition. The low-voltage 5.0V AVDD at pin 10 powers control logic circuitry and also acts as a reference voltage to set the output LED current level.

The IC driver in FIGS. 2A,2B has the following features, input, output, and control points. Junction J1 is supplied with low voltage AC power and the signal is rectified by the combination of D4A, D4B, D5A, D5B, C14, C12 and C16. VRECT is ultimately fed to inductor L1, then through a Schottky diode D3 to jack junction J2 which leads to the LED lamp or lamps. Vin at pin 1 is the smoothed step-down voltage from VRECT caused by resister R13 and capacitor C17. Vin is the input of the high-voltage regulator. PVBB at pin 2 (see FIG. 1, PVDD) is a regulated 10V supply for the two gate drivers, FLT (pin 11) and GATE (pin 3). PVBB is bypassed with C15, a low ESR capacitor to ground, GND. GATE at pin 3 is the IC driver output for the switching FET, Q1a. Resistors R20, R21 provide feedback to controller in support of Q1a for input as to IN/OFF operations. CS at pin 5 senses the source current of the external power FET, Q1a. C11 and R16 conditions the feedback to the CS pin. HCP pin 6 is the IC's hiccup timer. Capacitor C19 programs the hiccup time. RT pin 7 sets the frequency of the power circuit. A resistor R19 programs the IC driver circuit in the constant frequency mode. The switching frequency of the IC is synchronized to the PWMD pin 13 input. The oscillator turns ON once PWMD goes high. SYNC pin 8 is open in this embodiment. SS pin 9 provides soft start upon turn-ON of the IC. A capacitor C22 at the SS input programs the soft start time.

The embodiment in FIGS. 2A,2B has an AVDD 5V power supply at pin 10 for the internal IC circuits. Capacitor C21 isolates the power supply and is a low ESR capacitor. The FLT (pin 11) is used to drive external disconnect FET Q2a which disconnects the load from the circuit during a fault condition or during PWM dimming. OVP at pin 12 provides the overvoltage protection for the converter with resistive divider R14, R18. When the OVP voltage at this pin exceeds 1.25V, the GATE output FLT (pin 11) is turned OFF and FLT goes low. The hiccup timer starts when the voltage at the OVP pin is low. Capacitor C13 is a noise filter and a power conditioner.

PWMD at pin 13 is an input control such that when the PWMD signal is pulled to GND, the IC driver switch output is disabled OFF. The PWMD is coupled to the low voltage turn-OFF circuit in FIG. 7. The COMP (pin 14) control is a stable closed-loop control. The COMP control is isolated by capacitor C20. The FDBK at pin 16 is an output current feedback voltage to the IC driver using a current sense resistor R22, R23. Current resistors R22, R23 provide a representation of current to the LED IC to inform the controller if the voltage output to the LED lamp(s) is proper.

The IC driver 20 in FIGS. 2A, 2B has an IREF input pin 15. The voltage at IREF sets the output current of the IC driver 20. IREF pin 15 is supplied with a voltage reference control signal IADJ. See FIGS. 3-6 for the IADJ voltage reference control signal.

In the present invention, the outputs from current regulation circuits in FIGS. 4, 5, 6 generate a voltage reference control IADJ and the lowest control IADJ is applied to junction 37 (see FIG. 3) and then to the IREF IC input. The IADJ voltage reference signal controls the output current of the IC driver by way of the IC's IREF input. The circuits in FIGS. 3-6 are sometimes referred to as an "Input Voltage Monitor", "Potentiometer Control Circuit", and a "Temperature Monitor Circuit."

The IADJ provides an over-temperature voltage reference control, an under voltage voltage reference control and a low voltage turn-OFF LED driver control. Also, to permit the user to more easily control the lumen output of the LED, a remote-controlled variable resistor (VR)(the Potentiometer Control Circuit) reduces the power output of the IC LED driver. These controls provide dimmer circuits for the IC 20.

Figure 3:
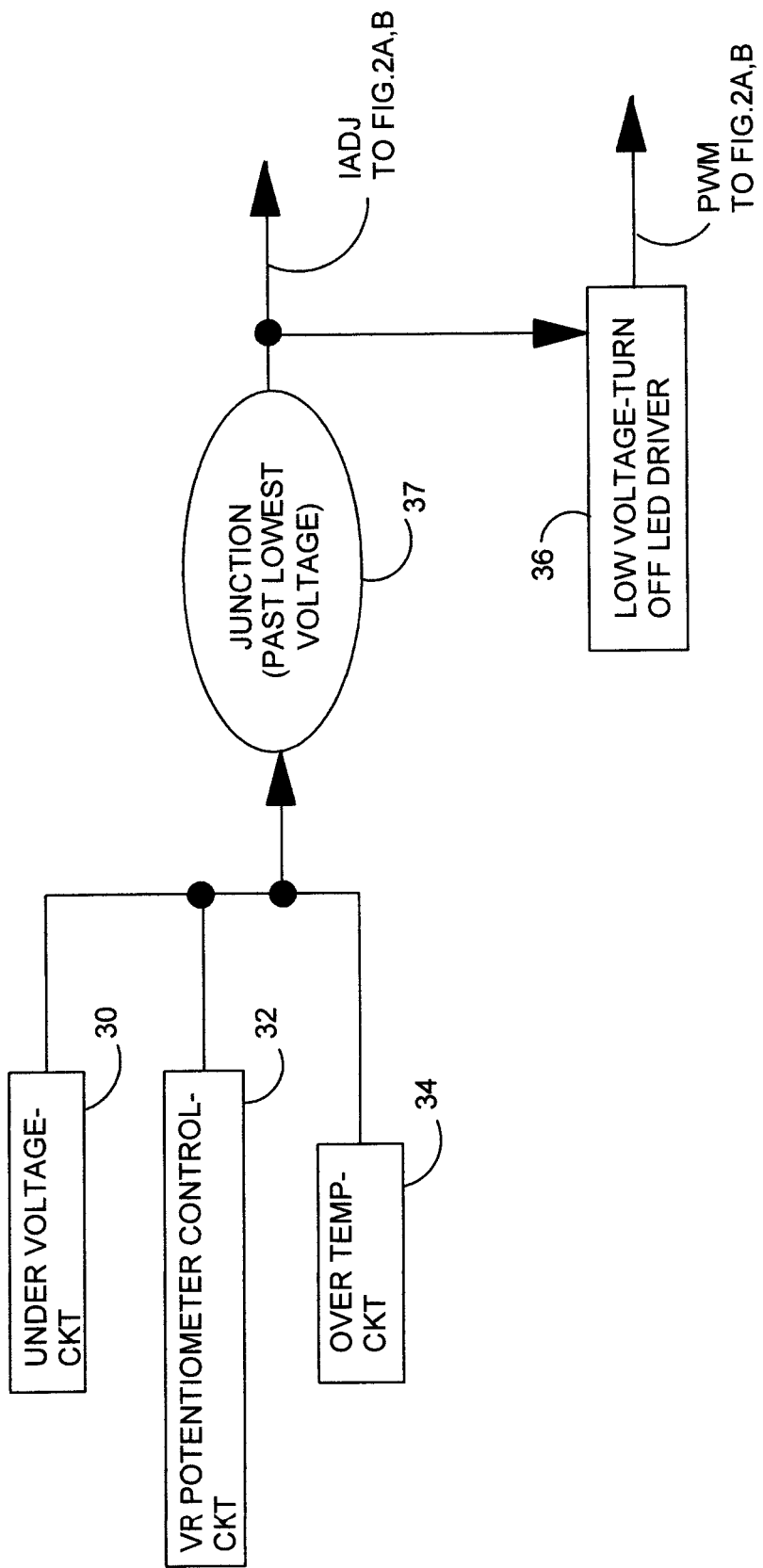
FIG. 3 is a functional block diagram showing the under voltage control circuit (an input voltage monitor), the variable resistor (VR) control circuit (a potentiometer control circuit), the over-temperature control circuit and the chronically low voltage turn-OFF circuit in accordance with the principles of the present invention (a temperature monitor circuit) (these voltage control circuits effecting and controlling the IC output current by way of a voltage reference control signal IREF, and hence the power supplied to the connected LED load)

FIG. 3 is a functional block diagram showing the under voltage control circuit 30, the variable resistor (VR) control circuit 32, the over-temperature control circuit 34 and the chronically low voltage turn-OFF circuit 36 in accordance with the principles of the present invention. The lowest V level output from control circuits 30, 32, 34 are applied to junction 37 and the result is a voltage reference control signal IADJ fed to IREF pin 15 in IC 20 (FIG. 2A). The voltage reference control signal IADJ is also fed to low voltage turn OFF control 36. The output from low voltage control is fed to PWMD pin 13 in IC 20 (FIG. 2A). Resistor R17 (FIG. 2A) further moderates the PWM control signal. Capacitor C18 acts as a filter.

FIG. 4 is a schematic of the under voltage control circuit in accordance with the principles of the present invention (an Input Voltage Monitor). If the VRECT, which is effectively the power input supplied to the IC, suffers from a low voltage condition, the prior art IC 20 increases the current output to match the LED load requirements. The under voltage control circuit senses input voltage supply VRECT and effectively compares the VRECT to the 5V reference voltage at AVDD pin 10. Op amp U1 (FIG. 4) is a level shifter and adds an offset and reduces the voltage reference control signal at IREF pin 15 of IC 20. R5 and R6 is a voltage divider and capacitors C3 and C4 filter and isolate the output of the divider. Capacitor C2 with R4 is a filter. Capacitor C5 is a filter for the op amp U1. Resistors R1, R4, R2 and R3 provide a reference voltage and a feedback for the op amp U1. C1 isolates the 5V reference voltage. The output VOLTAGEDim is applied to diode D1. Diodes D1 (FIG. 4) and D2 (FIG. 6, over temperature control) limit the voltage level of these two control circuits such that the lowest level voltage reference control signal is applied at junction 37 in FIG. 3, resulting in control signal IADJ.

The under-voltage circuit of FIG. 4 generates a first input VOLTAGEDim to junction 37 (FIG. 3) and the first input reduces the voltage reference signal applied to IREF pin 15 when an input voltage of the LED driver VRECT (VRECT supplied to the under-voltage circuit) falls below a predetermined level set by the op amp U1. Diode D1 limits the control voltage reference IADJ signal to the lowest V value at junction 37.

When the input voltage to the LED load is too low, the current controls of the present invention use a boost-type LED driver. The boost LED driver boosts or increases the input voltage to a level required by LED load therefore it can maintain constant LED current down to lower voltage AC levels. The implemented current foldback of the present invention is activated when input voltage VRECT goes below a predefined level. This control will limit power dissipation due to increased input current.

Another problem with prior art driver systems is when the voltage requirement of COB LEDs (clip-on board LED lamps) is higher than the low voltage AC can supply. In this situation, the boost LED driver is used as discussed in connection with FIG. 4.

Prior art systems had no input dimming protection. The invention in FIG. 4 provides an under voltage dimming input, current-based control for the IC 20. When the input voltage drops below 9V, the LED driver reduces the lumen output by dimming the LED light(s) until 7V when controller 20 will shut down driver. Diode D1 in FIG. 4 assures that the lowest level dimming voltage controls will be applied to IC 20 (the lowest V signal from control circuits FIGS. 4, 6).

FIG. 5 is a schematic of the variable resistor (VR) control circuit (a Potentiometer Control Circuit). Variable resistor VR 60 provides, in one embodiment, a manual control to reduce current to the LED IC driver 20. In one embodiment, at installation, the installer sets a DIP switch to set the resistor at a prescribed dim control voltage. In another embodiment, the consumer possesses a remote control (BlueTooth, IR, etc.) and VR 60 has a NFC receiver which adjusts the resistive value of VR 60 as per the user defined remote control. Resistors R7, R8 in FIG. 5 act as voltage dividers for the potentiometer circuit for dimming the IC 20 output by changing the IADJ voltage at junction 37 in FIG. 3, all applied to the IREF pin 15 control input for IC 20. The VR control circuit in FIG. 5 has a maximum voltage level of 1 v at junction 37.

The problem in the prior art is that manual adjustment of the dim voltage level requires either opening driver system to adjust internal potentiometer or making the potentiometer accessible from the outside which adds machining cost and increases the likelihood of moisture getting into fixture. The solution is to add a near field coil (NFC) receiver, sensing RF, IR or other remote applied control signals, to LED PCB and feed a current control signal from NFC IC to the LED driver. Current can be changed even if fixture is not powered. Current control circuit in FIG. 5 addresses that problem.

Prior art systems had no dimming protection. The current control circuits in FIGS. 4 and 5 provide a voltage dimming input current-based controls for the IC 20 such that the lowest dim voltage is supplied to the IREF pin 15 control input for IC 20 via junction 37.

The variable resistor (VR) control circuit in FIG. 5 (Potentiometer Control Circuit) generates a third input to junction 37 to reduce the voltage reference signal IREF pin 15 under control of VR 60 in the VR control circuit. The maximum voltage output by VR control is 1 v. The first input signal to junction 37 is the VOLTAGEDimm signal from FIG. 4. The second signal to junction 37 is the output of the over-temperature circuit in FIG. 6.

FIG. 6 is a schematic of the over-temperature current control circuit (Temperature Monitor Circuit) in accordance with the principles of the present invention. In FIG. 6, U3 is a temperature sensor IC, typically an analog output CMOS integrated-circuit temperature sensor. In one embodiment, the sensor is an LMT87, made by Texas Instruments (2.4-V, 10-µA, operative over a temperature range of −55° C. to 130° C.). OP amp U4 acts as a comparator to adjust the voltage and reduce it to generate a voltage reference control signal applied to junction 37 as IADJ and then applied to IREF pin 13 in FIG. 2A. The lowest control signal from control circuits 30 and 34 are applied to junction 37. Sensor U3 is supplied with 5V power and its output represents the temperature of IC 20 because sensor U3 is positioned adjacent or near IC 20 on the printed circuit board (PCB). Also, sensor U3 senses the overall temperature on and about the PCB, which of course is a combination of the heat generated by the COB LED mounted on the PCB (one embodiment) and the ambient, environmental temperature. For a multiple LED lamp system (a string of LEDs) or when the LED power circuitry is physically separated from the LED lamp or lamps, sensor U3 senses the overall temperature on and about the PCB, that is, the heat generated by the power circuitry itself. Resistors R11, R12 form a voltage divider circuit, capacitor C10 and resistor R12 act as a filter. Diode D2 passes the lowest voltage level, representing the control signal, to junction 37 as IADJ which is then applied to IREF pin 15. Also, diode D1 in the under-voltage current circuit of FIG. 4 passes the lowest level of control signal to junction 37, ultimately effecting IADJ applied to IREF pin 15. Capacitor C8 isolates the SV power supply.

The over-temperature control circuit in FIG. 6 (Temperature Monitor Circuit) generates a second input to the junction 37 and this second input reduces the voltage reference signal IREF pin 15 when a proximally sensed temperature signal from sensor IC U3 (proximal to LED IC driver 20, FIG. 2A) exceeds a predetermined level. The lowest voltage, representing the lowest voltage reference control signal, from either the under-voltage circuit FIG. 4 or the over-temperature circuit FIG. 6 is supplied as IADJ, via junction 37, to the IREF control input at IC driver 20.

The internal cavity of a brass fixture may heat up due to the LED driver and the adjacent LED lamp. LED power dissipation shortens life of the LED lamp and the LED driver. Long runs of low voltage AC wiring may drop the supply voltage below what LED driver was designed for. A lower input can cause overheating of the LED driver. Also, external heating of the lamp fixture due to sun and ambient heat (like an automobile in the sun) shortens the life of the LED lamp and the LED driver. Hot environments during the day can lead to thermal runaway of LED driver circuitry.

The solution to these problems is the implementation of current foldback when the LED fixture cavity temperature approaches safe limits. This will limit the maximum temperature of LED driver components. Also, electrolytic capacitor reliability (capacitor is mounted on the PCB) is directly impacted by excessive temperatures. The solution is to reduce current when input voltage drops below a pre-defined level which will reduce power dissipation and limit temperature. By reducing current when driver internal temperature increases above a predefined level, this will reduce power dissipation and limit temperature. As for the long run, low voltage AC wiring problem, control circuit in FIG. 4 monitors the supply voltage to the LED IC driver.

The solution to these problems in prior art systems (these systems without over temperature dimming protection) is provided by the control circuit of FIG. 6. Exterior temperatures plus the internal heat created by LED driver and the LED lamp can cause a shortened life for the LED and driver or failure. Over temperature dimming provided by sensor U3, an analog temperature sensor, gives an output that is proportional to the temperature. As the temperature goes up, the output goes down (lower current outputs), thereby protecting the LED lamp and LED driver.

In the operative embodiment, if any of the three dimming circuits in FIGS. 4, 5, 6 causes IREF pin 15 to go to below 1V, these circuits provide extreme precision and overall protection. This protection represents 300MA at 1V for IREF pin 15 of the IC 20 in FIG. 2A.

Figure 7:
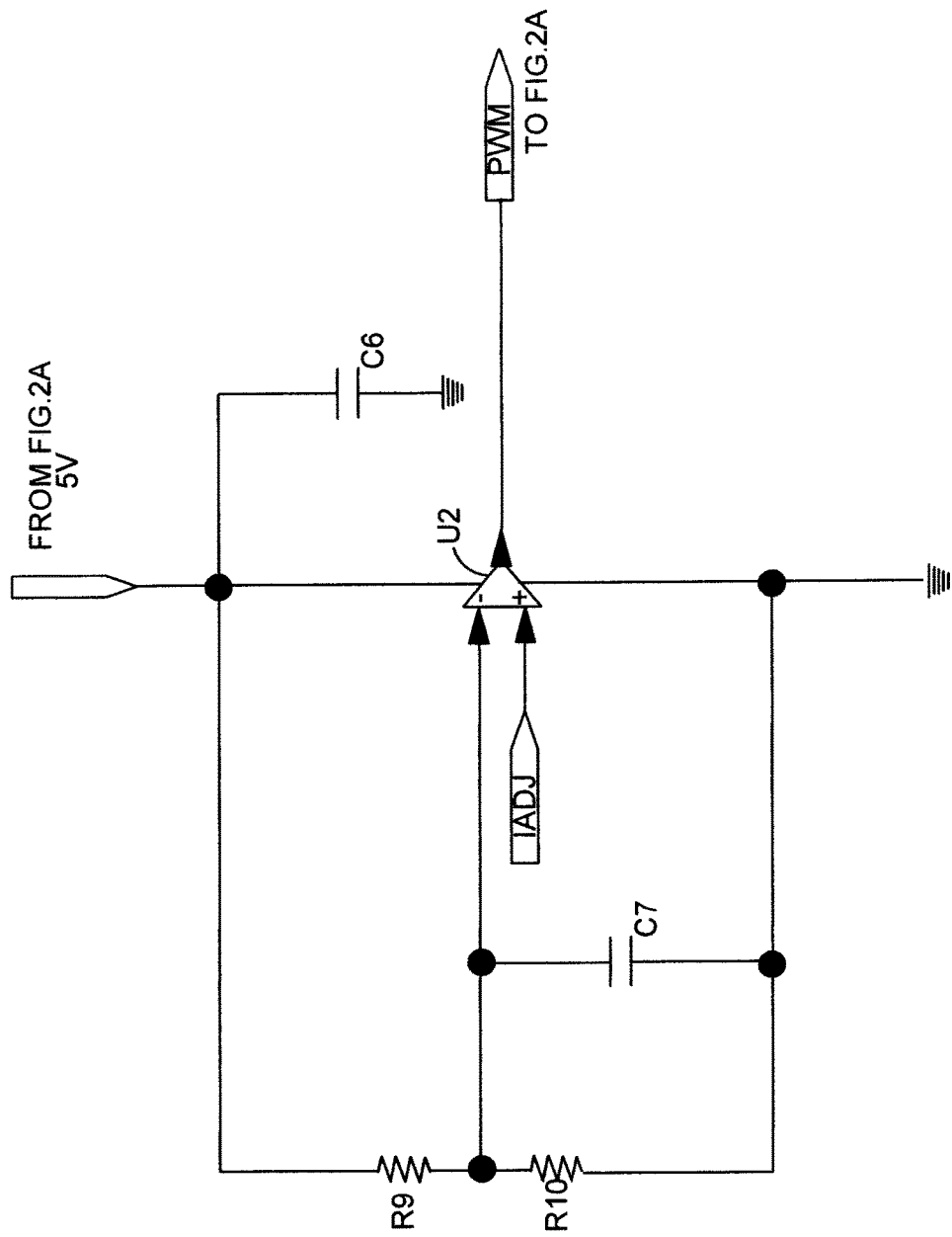

FIG. 7 is a schematic of low voltage turn-OFF circuit in accordance with the principles of the present invention. The low voltage turn OFF circuit monitors voltage at the IREF pin (control signal IADJ) and compares it to the reference signal created by voltage divider R9 and R10. When voltage at the IREF pin drops below the generated reference voltage the PWMD control pin of the IC is pulled low which disables the driver. Capacitor C7 isolates and filters the input to comparator U2. Capacitor C6 isolates the SV power.

The LED IC driver 20 has a disablement input PWMD pin 13. The PWMD is an input control (a "disable IC input control") such that when the signal at this PWMD is pulled to GND (or left open), the IC driver switch output is disabled OFF. This disable IC input control disconnects the LED load from the LED IC driver 20. The low voltage turn OFF circuit of FIG. 6 generates and applies a disablement signal PWM at disable IC input control PWMD pin 13, FIG. 2A, which disables and turns OFF the IC driver based upon sensing a very low voltage at the junction 37, FIG. 3. This very low voltage is based upon IADJ at the junction 37.

The problem solved by the FIG. 7 control circuit is that, in prior art systems, the dip switch did not turn off the LED driver even when voltage at the IADJ junction was zero. The output of the control OFF circuit is applied to the PWMD pin 13 of the IC driver 20 in FIG. 2A. As explained above, the control signal applied to the PWMD turns OFF the LED driver 20. With the use of VR 60 in FIG. 5, when potentiometer VR 60 is turned to zero, the lighting control circuit should turn OFF the LED lamp or string of LED lights. However, placing the potentiometer VR 60 to zero did not turn OFF the driver circuit. Hence, the low voltage turn OFF control circuit monitors the IADJ control signal and when that signal falls below a pre-set or predetermined level, the IC driver 20 is completely turned OFF by dropping the PWM input at PWMD pin 13 of FIG. 2A.

The claims appended hereto are meant to cover modifications and changes within the scope and spirit of the present invention.

What is claimed is:

1. In combination with an LED integrated circuit (IC) driver having a voltage reference input to control an IC output current for an LED load demand, the IC supplied with an input voltage, a current regulation system for the IC output current comprising:
   an under-voltage circuit which generates a first input to a junction which first input reduces the voltage reference signal at the junction when the input voltage to the LED driver falls below a predetermined level; and
   an over-temperature control circuit which generates a second input to the junction which second input reduces the voltage reference signal at the junction when a proximally sensed temperature of the LED driver exceeds a predetermined level;
   wherein the junction is electrically connected to the voltage reference input of the LED IC driver.

2. The combination of the LED IC driver and the current regulation system as claimed in claim 1 wherein the under-voltage circuit and the over-temperature control circuit have first and second voltage limiters passing the lowest level of the voltage reference signal to the junction as the voltage reference input.

3. The combination of the LED IC driver and the current regulation system as claimed in claim 2 including:
   a variable resistor (VR) control circuit to generate a third input to the junction to reduce the voltage reference signal under control of a VR in the VR control circuit, the third input not to exceed a predetermined level.

4. The combination of the LED IC driver and the current regulation system as claimed in claim 3 wherein the LED IC driver has a disable IC input control which disconnects a LED load from the LED driver, the current regulation system including:
   a low voltage turn OFF circuit generating and applying a disablement signal to the disable IC input control based upon sensing a very low voltage at the junction.

5. The combination of the LED IC driver and the current regulation system as claimed in claim 2 wherein the LED IC driver has a disable IC input control which disconnects a LED load from the LED driver, the current regulation system including:
   a low voltage turn OFF circuit generating and applying a disablement signal to the disable IC input control based upon sensing a very low voltage at the junction.

6. The combination of the LED IC driver and the current regulation system as claimed in claim 1 including:
   a variable resistor (VR) control circuit to generate a third input to the junction to reduce the voltage reference signal at the junction under control of a VR in the VR control circuit, the third input not to exceed a predetermined level.

7. In combination with an LED integrated circuit (IC) driver having a voltage reference input IREF to control an IC output current for an LED load demand, the LED IC driver having a pulse width modulation converter operating at a substantially constant frequency with peak current and slope compensation, the LED IC driver having an internal transconductance amplifier to control the IC output current, and the IC driver having a disable IC input control to disconnect the LED load from the LED IC driver, the IC supplied with a input voltage, a current regulation system for the IC output current comprising:
- an under-voltage circuit which generates a first input to a junction which first input reduces the voltage reference signal when the input voltage to the LED driver falls below a predetermined level;
- an over-temperature control circuit which generates a second input to the junction which second input reduces the voltage reference signal when a proximally sensed temperature of the LED driver exceeds a predetermined level;
- wherein the junction is electrically coupled to the IREF input of the IC; and
- a low voltage turn OFF circuit generating and applying a disablement signal to the disable IC input control based upon sensing a very low voltage at the junction.

8. The combination of the LED IC driver and the current regulation system as claimed in claim 7 wherein the under-voltage circuit and the over-temperature control circuit have first and second voltage limiters passing the lowest level of the voltage reference signal to the junction as the voltage reference input.

9. The combination of the LED IC driver and the current regulation system as claimed in claim 8 including:
- a variable resistor (VR) control circuit to generate a third input to the junction to reduce the voltage reference signal under control of a VR in the VR control circuit, the third input not to exceed a predetermined level.

10. The combination of the LED IC driver and the current regulation system as claimed in claim 7 including:
- a variable resistor (VR) control circuit to generate a third input to the junction to reduce the voltage reference signal under control of a VR in the VR control circuit, the third input not to exceed a predetermined level.

11. A current regulation system providing fine dimming controls, used in combination with an LED integrated circuit (IC) driver having a voltage reference input to control an IC output current for an LED lamp load and a LED IC driver input control, the IC supplied with an input voltage, the current regulation and dimming control for the IC output current comprising:
- an under-voltage control circuit which generates a first input to a junction which first input reduces a voltage reference signal at the junction when the input voltage to the LED driver falls below a predetermined level thereby dimming the LED lamp load;
- an over-temperature control circuit which generates a second input to the junction which second input reduces the voltage reference signal at the junction when a proximally sensed temperature of the LED driver exceeds a predetermined level thereby dimming the LED lamp load;
- first and second voltage limiters respectively on the under-voltage circuit and the overtemperature circuit, which cause the voltage reference signal at the junction to be the lower of the first input and the second input, and wherein the junction is electrically connected to the voltage reference input of the IC driver; and
- a low voltage turn OFF circuit generating and applying an IC disablement signal to the LED IC driver input control based upon sensing a very low voltage at the junction.

12. The combination of the LED IC driver and the current regulation system as claimed in claim 11 including:
- a variable resistor (VR) control circuit to generate a third input to the junction to reduce the voltage reference signal under control of a VR in the VR control circuit thereby dimming the LED lamp load, the third input not to exceed a predetermined level.

* * * * *